(12) United States Patent
Muller et al.

(10) Patent No.: US 10,721,541 B2
(45) Date of Patent: Jul. 21, 2020

(54) MEASUREMENT OF TELEVISION ADVERTISEMENT EFFECTIVENESS

(71) Applicant: ISPOT.TV, INC., Bellevue, WA (US)

(72) Inventors: Sean Muller, Bellevue, WA (US); Greg Havener, Bellevue, WA (US); Dennis Ameen, Bellevue, WA (US); Scott Happell, Bellevue, WA (US); Nicole Lawless DesJardins, Bellevue, WA (US); David Friedl, Bellevue, WA (US)

(73) Assignee: ISPOT.TV, INC., Bellevue, WA (US)

( * ) Notice: Subject to any disclaimer, the term of this patent is extended or adjusted under 35 U.S.C. 154(b) by 58 days.

(21) Appl. No.: 16/036,312

(22) Filed: Jul. 16, 2018

(65) Prior Publication Data

US 2020/0021893 A1 Jan. 16, 2020

(51) Int. Cl.

| | | |
|---|---|---|
| *H04H 60/33* | (2008.01) |
| *H04H 60/45* | (2008.01) |
| *H04H 60/32* | (2008.01) |
| *H04H 20/14* | (2008.01) |
| *H04H 60/29* | (2008.01) |
| *H04N 7/10* | (2006.01) |
| *H04N 7/025* | (2006.01) |
| *H04N 21/81* | (2011.01) |
| *H04N 21/858* | (2011.01) |
| *G06Q 30/02* | (2012.01) |
| *H04N 21/442* | (2011.01) |
| *H04N 21/643* | (2011.01) |

(52) U.S. Cl.
CPC ....... *H04N 21/812* (2013.01); *G06Q 30/0246* (2013.01); *H04N 21/442* (2013.01); *H04N 21/64322* (2013.01); *H04N 21/8586* (2013.01)

(58) Field of Classification Search
CPC ............... H04N 21/812; H04N 21/442; H04N 21/64322; H04N 21/8586; G06Q 30/0246
See application file for complete search history.

(56) References Cited

U.S. PATENT DOCUMENTS

2015/0348096 A1* 12/2015 Ferber ................ G06Q 30/0251 705/14.49
2018/0084308 A1* 3/2018 Lopatecki ............. H04H 60/31

* cited by examiner

*Primary Examiner* — Kyu Chae
(74) *Attorney, Agent, or Firm* — Schwabe, Williamson & Wyatt, P.C.

(57) ABSTRACT

Apparatuses, methods, and storage media for determining effectiveness of an advertisement are described. In one instance, an apparatus for determining effectiveness of an advertisement may include a digital device matching engine, communicatively coupled to the processors, to receive and process information obtained from a web site accessed by a digital device, and to match the digital device to a TV set, based at least in part on the processed information. The apparatus may further include a conversion determination engine, communicatively coupled to the processors, to determine a level of conversion associated with an advertisement rendered by a broadcasting media to the TV set, based at least in part on the matching of the digital device to the TV set. The apparatus may be configured to provide recommendations to advertisement regarding the effectiveness of their advertising campaign. Other embodiments may be described and claimed.

17 Claims, 7 Drawing Sheets

MEASUREMENT OF TELEVISION ADVERTISEMENT EFFECTIVENESS

TECHNICAL FIELD

The present disclosure relates to the field of content provision by broadcasting media, and in particular, to measuring an effect of a television advertisement rendered by the broadcasting media.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Traditional systems of real-time content provision, such as broadcast television (TV) of live sports, concerts, shows, films, and news, provide content that may include commercials, or advertisements. Such advertisements may be provided for rendering by e.g., product manufacturers or merchants, such as or product or service sales entities, in order to bring the users' attention to a particular product or service. Increasingly, television advertisements have been designed to work together with digital media. For example, a television advertisement may advertise a product and note that a user may learn more about that product by visiting a particular web site or downloading an application. The television advertisement can also serve to offer viewers special deals via digital media. Accordingly, advertisement providers (e.g., business owners, product manufacturers or service providers, hereinafter "advertisers") may be interested to have an ability to measure the impact of an advertisement, such as assess how a viewed advertisement may drive users to corresponding digital media platforms. The advertisers may be also interested in getting informed advice about how their advertisement campaigns may be improved and made more efficient.

In one example, existing advertisement campaign effectiveness measurement techniques may rate the number of viewers watching TV programs and break the results down demographically, so that advertisers may have more detailed information about the viewers. In another example, the usefulness of a TV advertisement may be measured by tracking the percentage of the possible audience that sees an advertisement and how often that advertisement is viewed.

However, existing advertisement effectiveness measurement solutions may provide inadequate and sometimes inaccurate results. For example, existing solutions may not provide a correlation between a number of users who viewed a particular TV advertisement and their responses, such as users' subsequent actions based on the content of the viewed advertisement (e.g., visiting a recommended web site, viewing or purchasing advertised product and the like).

BRIEF DESCRIPTION OF THE DRAWINGS

Embodiments will be readily understood by the following detailed description in conjunction with the accompanying drawings. Embodiments are illustrated by way of example, and not by way of limitation, in the figures of the accompanying drawings.

DETAILED DESCRIPTION

Figure 1:
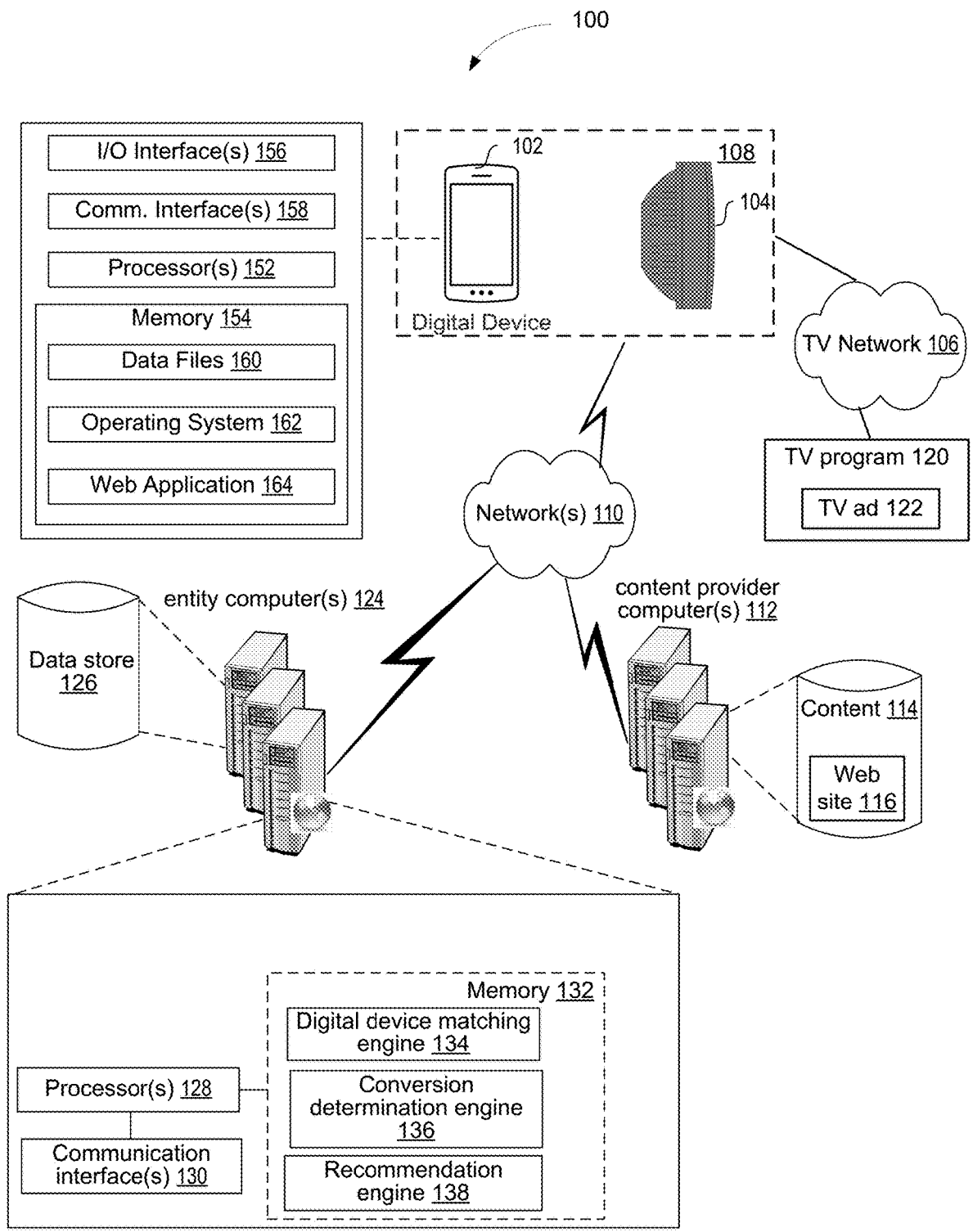
FIG. 1 is a block diagram illustrating an example computing environment for TV advertisement effectiveness measurement, in accordance with some embodiments.

Embodiments of the present disclosure describe techniques and configurations for determining effectiveness of an advertisement, in accordance with some embodiments. In some embodiments, an apparatus for determining effectiveness of an advertisement may include one or more processors. The apparatus may further include a digital device matching engine, communicatively coupled to the processors, to receive and process information obtained from a web site accessed by a digital device, and to match the digital device to a TV set, based at least in part on the processed information. The apparatus may further include a conversion determination engine, communicatively coupled to the processors, to determine a level of conversion associated with an advertisement rendered by a broadcasting media to the TV set, based at least in part on the matching of the digital device to the TV set. Conversion may define one or more user actions on the web site in response to viewing the advertisement on the TV set. In embodiments, the apparatus may be configured to provide recommendations to advertisement regarding the effectiveness of their advertising campaign.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "logic" and "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram illustrating an example computing environment for TV advertisement effectiveness measurement, in accordance with some embodiments.

The environment 100 may include one or more electronic digital devices 102. The digital device 102 may include any appropriate device operable to send and receive requests, messages, or information over an appropriate network 110 and convey information back to a user of the digital device 102. Examples of such digital devices may include personal computers, smartphones, laptop computers, set-top boxes, tablet computers, and the like. The digital device 102 may include a processor 152 and memory 154 for storing processor-executable instructions, such as data files 160, operating system 162, and one or more web applications 164 allowing the users to interact with network resources, such as, for example, social networking web sites or a web site of a merchant. The digital device 102 may further include at least one or more of the following elements: input/output interface (e.g., a display or a screen) 156 and communication interface 158.

The environment 100 may further include a TV set 104, which may render TV programs (e.g., shows and the like) and TV advertisements for viewing by the user. The TV programs, including TV advertisements may be provided by broadcasting entities via TV network 106. In embodiments, the digital device 102 and 104 may be associated with a particular user, e.g., may belong to a user, and may be disposed at a shared location 108, for example, a user's residence, place of work, or the like. TV network 106 may commonly, though not exclusively, distribute linear television content through operators, such as through cable companies. TV network 106 may distribute linear television content directly through certain types of TV distribution media, such as through terrestrial broadcast media. Television content distributed for rendering on TV set 104 may include, for example, programs 120, such as shows, films, sport and music events, etc. The programs 120 may include one or more TV advertisements 122 provided by advertisers for rendering with the programs.

The network 110 may be any appropriate type of network, including an intranet, the Internet, a cellular network, a local area network, or any other such network or combination thereof. Protocols and components for communicating via such a network are well known and will not be discussed herein in detail. Communication over the network may be enabled by wired or wireless connections, and combinations thereof. In embodiments, the network 110 may include the Internet, and the environment 100 may include one or more computing devices, such as content provider servers 112 for receiving requests and serving content 114 in response thereto. The content 114 served by the content provider servers 112 may include network resources, such as merchant web site 116 accessible by the users of the digital device 102. The web site 116 may host information about (e.g., a catalog of) items (products services, or the like) offered by the merchant for viewing and purchase.

A merchant may be an entity that facilitates a provision of content (e.g., items for purchase stored in the catalog) to an associated network resource (e.g., web site 116). The items for purchase may be provided by the merchant and/or by third parties that may or may not be associated with the merchant. The merchant or a third party associated with the merchant may be an advertiser, e.g., it may provide a TV advertisement (or advertisements) 122 describing a product or service, for rendering with the program 120.

The illustrative environment 100 may include one or more computing devices 124 associated with an advertisement effectiveness measurement entity, e.g., a business entity that may provide the service of measurement of effectiveness of advertisements and recommendations regarding effectiveness of advertisement campaigns. In embodiments, the computing device 124 may be associated with (e.g., have access to) a data store 126. The data store 126 may store content provided by a merchant-associated entity, e.g., web site 116, and/or user devices, such as digital device 102 and/or TV set 104.

The content may include data (e.g., user-associated data, viewing data, or the like) that may be used for the measurement of effectiveness of TV advertisements. The user-associated data may include, for example, the date and time of the user access of the web site 116 via the digital device 102, an internet protocol (IP) address associated with the digital device 102, a web site 116 identifier, a user identifier associated with the web site 116, a uniform resource locator (URL) associated with the web site 116, a type of a browser associated with access to the web site 116 (e.g., the browser residing on the digital device 102), a type of the digital device 102; operating system (OS) associated with the digital device 102, tracking cookies, and/or or one or more tags for reporting or filtering, supplied by the merchant or a third party associated with the merchant.

The data may further include indication of locations of the digital device 102 and TV set 104. For example, the data may indicate that the digital device 102 and TV set 104 share the common location 108.

The data may further include viewing data. For example, TV set 104 may report back to a data collection entity (e.g., computing device 124) the content being watched by the user. The data collection entity may utilize an advertisement video catalog (e.g., internally generated catalog) to detect, e.g., using video fingerprinting, when devices (e.g., digital device 102 and/or TV set 104) are rendering for display specific commercials. The data collection entity may generate a log of the viewing data (e.g., TV set 104 viewing data). The log may include the date/time of the event, user's IP address, a unique TV device ID, and the advertisement that was viewed. This data may be used to determine when a TV device and a digital device share the same location (IP) at generally the same time to determine a TV device ID associated with the user, which may then be used to determine historical viewing data.

The data may further include one or more conversion actions (events) associated with the user and executed on the digital device 102. In embodiments, the conversion actions may include user activities resulting from viewing the TV advertisement 122 on the TV set 104. For example, the user viewed a TV advertisement about one or more items (e.g., products or services). In embodiments, the conversion actions resulting from viewing the TV advertisement may include one or more of: using the digital device 102, accessing a web site that hosts information about the items; viewing information about the item; selecting one or more of the viewed items; adding the selected items to cart, checking out the selected items, and the like.

In general, the user-associated data may include any user identity indicators that may be provided by a web site visited by the user via her digital device, and/or user identity indicators that may be provided by the digital device associated with the user.

The computing device 124 may include, or associate with, one or more processors 128 that may be connected to a communication interface 130 and memory 132. In embodiments, the memory 132 may include (e.g., store) a digital device matching engine 134, communicatively coupled to, and executable on, the processors 128, to process one or more user identity indicators received from a web site (e.g., 116) accessed by a digital device (102). The digital device matching engine 134, when executed on the processors 128, may be configured to match the digital device 102 to a TV set (e.g., 104). The matching may be provided based at least in part on the user-associated data, such as one or more identity indicators listed above.

The memory 132 may further include a conversion determination engine 136, communicatively coupled to, and executable on the processors 128. In embodiments, the conversion determination engine 136 may be configured to determine a level of conversion associated with an advertisement (e.g., 122) rendered by a broadcasting media to the TV set 104, based at least in part on the matching of the digital device 102 to the TV set 104, provided by the digital device matching engine 134. As noted, conversion may define user actions on the web site in response to viewing the advertisement on the TV set.

The memory 132 may further include a recommendation engine 138, communicatively coupled to, and executable on the processors 128. In embodiments, the recommendation engine 138 may be configured to provide advertisement recommendations to advertisers, as described in greater detail in reference to FIG. 5.

While the digital device matching engine 134, conversion determination engine 136, and recommendation engine 138 are described herein as software residing in memory 132, other implementations are possible. For example, the digital device matching engine 134, conversion determination engine 136, and recommendation engine 138 may be implemented as software, hardware, firmware, or any combinations thereof.

The environment 100, in some embodiments, may be a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
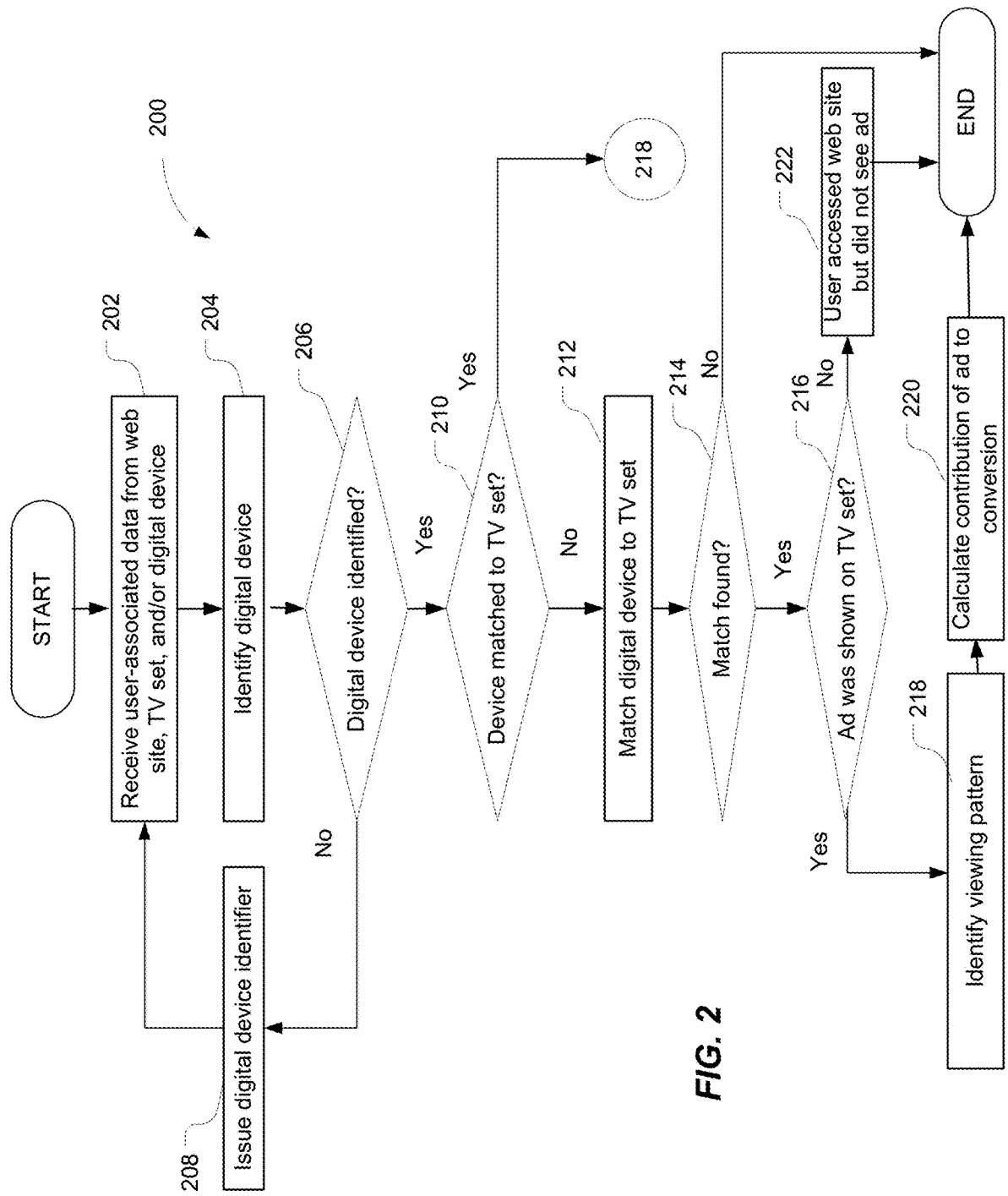
FIG. 2 illustrates an example process for advertisement effectiveness measurement, in the environment of FIG. 1, in accordance with some embodiments.

FIG. 2 illustrates an example process for advertisement effectiveness measurement, in the environment of FIG. 1, in accordance with some embodiments. The process 200 may be performed, for example, by the computing device 124 configured with the digital device matching engine 134 and conversion determination engine 136 described in reference to FIG. 1. It should be understood that the actions described in reference to FIG. 2 may not necessarily occur in the described sequence. Some actions may take place substantially concurrently with other actions described in reference to FIG. 2.

The process 200 may begin at block 202, and include receiving user-associated data from a web site (116), TV set (104) and/or digital device (102). As described above, the data may be used for the measurement of effectiveness of TV advertisements and may include, for example, the date and time of the user access of the web site 116 via the digital device 102, an IP address associated with the digital device 102, a web site 116 identifier, a user identifier associated with the web site 116, a URL associated with the web site 116, a type of the browser residing on the digital device 102, a type of the digital device 102; OS associated with the digital device 102, tracking cookies, tags for reporting or filtering, conversion data, and location information.

At block 204, the process 200 may include identifying a digital device associated with the user. The digital device identification may be provided base on the information listed above. The digital device identification may include associating a device with a user, determining a type of the digital device, or the like. The digital device identification may include recognizing a unique identifier issued to and associated with the device. The digital device identifier may be issued by the advertisement effectiveness measurement entity and provided by the computing device 124.

At decision block 206, the process 200 may include determining whether the digital device was identified. If the digital device was not identified, the process 200 may move to block 208, where a digital device identifier may be issued and associated with the digital device. As noted, the digital device identifier may be issued by the advertisement effectiveness measurement entity and provided by the computing device 124 to the digital device 102.

If the digital device was identified, the process 200 may move to decision block 210. At decision block 210, the process 200 may include determining whether the digital device is matched to the TV set. The matching may include associating the digital device with the TV set based on, for example, common location, user identity, IP address history, or the like. In some embodiments, a match may be determined based on identifying a user and recalling a TV set to which the user may have been matched previously.

If the digital device is matched to the TV set, the process 200 may move to block 218. If the digital device is not matched to the TV set, the process 200 may move to block 212, where such matching may occur. The matching process is described in greater detail in reference to FIG. 3.

At decision block 214, the process 200 may include determining whether the match was found. If the match was not found, the process 200 may end. If the match was found, the process 200 may move to decision block 216.

At decision block 216, the process 200 may include determining whether the advertisement was shown on the matched TV set. If the advertisement was not shown, the process 200 may move to block 222, in which a determination may be made that the user did access the web site, but did not see the advertisement, and therefore no conversion event has occurred. If the advertisement was shown, the process 200 may move to block 218.

At block 218, the process 200 may include identifying the user's viewing pattern. For example, using the TV viewing data, all relevant advertisement airings this user may have been exposed on TV set 104 to may be identified. The TV viewing data may be provided by the TV set 104. The viewing data may include a list of programs rendered on the TV set associated with the user over a period of time. As briefly described above, a data feed of TV set viewing data may be available from the TV set. Once a match to a TV set is completed, a corresponding viewing history and IP address-related history may become available.

At block 220, the process 200 may include calculating contribution of the advertisement to the conversion. The conversion contribution calculation process will be described in greater detail in reference to FIG. 4. The contribution of the advertisement to the conversion may serve as a measurement of the advertisement effectiveness.

Figure 3:
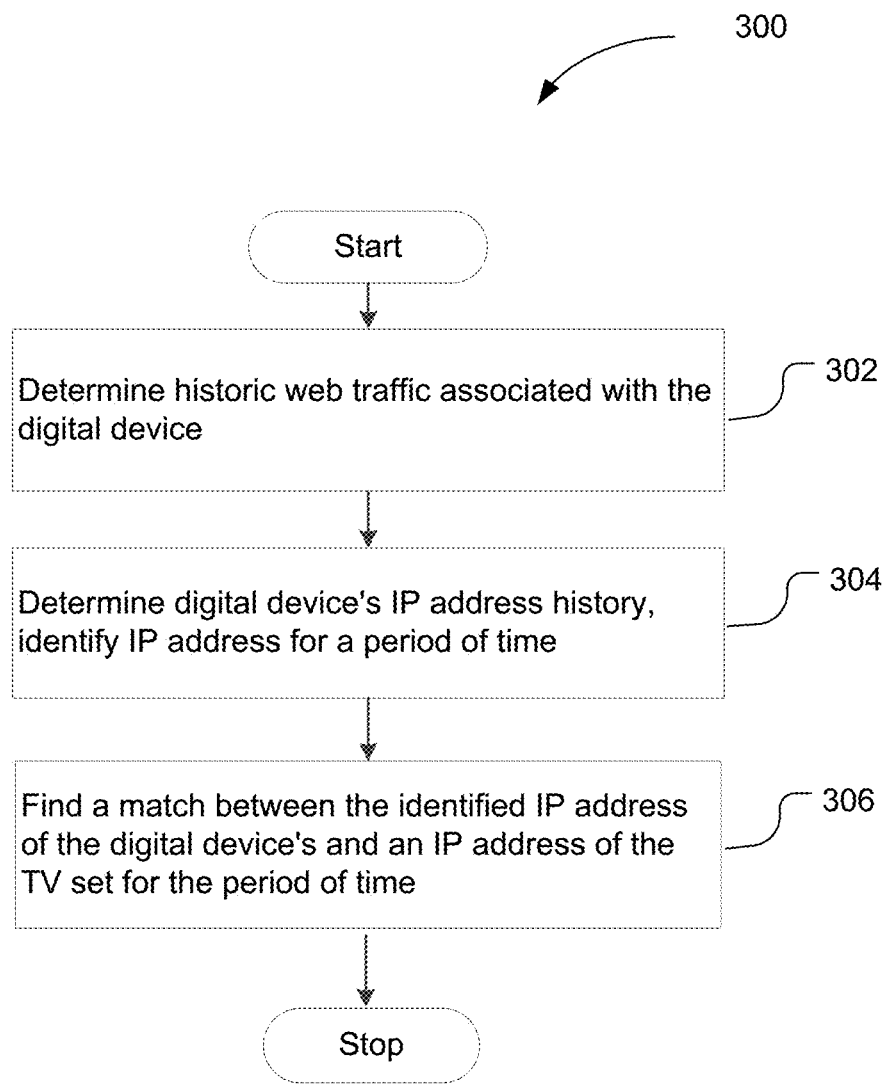
FIG. 3 illustrates an example process for matching a digital device to a TV set in the environment of FIG. 1, in accordance with some embodiments.

FIG. 3 illustrates an example process for matching a digital device to a TV set in the environment of FIG. 1, in accordance with some embodiments. The process 300 provides a description of actions described in reference to block 212 of FIG. 2.

The process 300 may begin at block 302 and include determining historic (e.g., previous) web traffic associated with the digital device. The digital device may have been identified earlier in the process of FIG. 2. Such determination may be performed using, for example, a tracking unique identifier assigned to the digital device by the merchant or by the advertisement effectiveness measurement entity, as described in reference to block 208 of FIG. 2.

At block 304, the process 300 may include determining digital device's IP address history, based on the determined web traffic. For example, the digital device's IP address history may be captured along with associated web traffic. Based on the IP address history, it may be possible to identify an IP address of the digital device during a particular time period. The time period may be, e.g., a particular week, day, or other time period of interest, such as the time period during which the merchant's advertisement was rendered on the TV set of the user.

At block 306, the process 300 may include finding a match between the identified IP address of the digital device's and an IP address of the TV set, for example, for the same time period (e.g., time period of interest). The matching may be performed using, for example, the viewing data associated with the TV set. For example, a device activity at the same IP address as the TV set may be identified and the matching may be based on this information. More specifically, viewing data may contain date/time and IP address for every event reported, and the IP history of the digital device and TV set may be compared, in order to produce a match. For example, IP address history from the digital device (from tracked web traffic) may be compared to IP address history from the TV set (e.g., through activity data supplied by a third party, e.g., the data partner, or by the business entity) to look for devices and TVs that occupied the same IP at the same time, meaning they are both at the same physical location.

Figure 4:
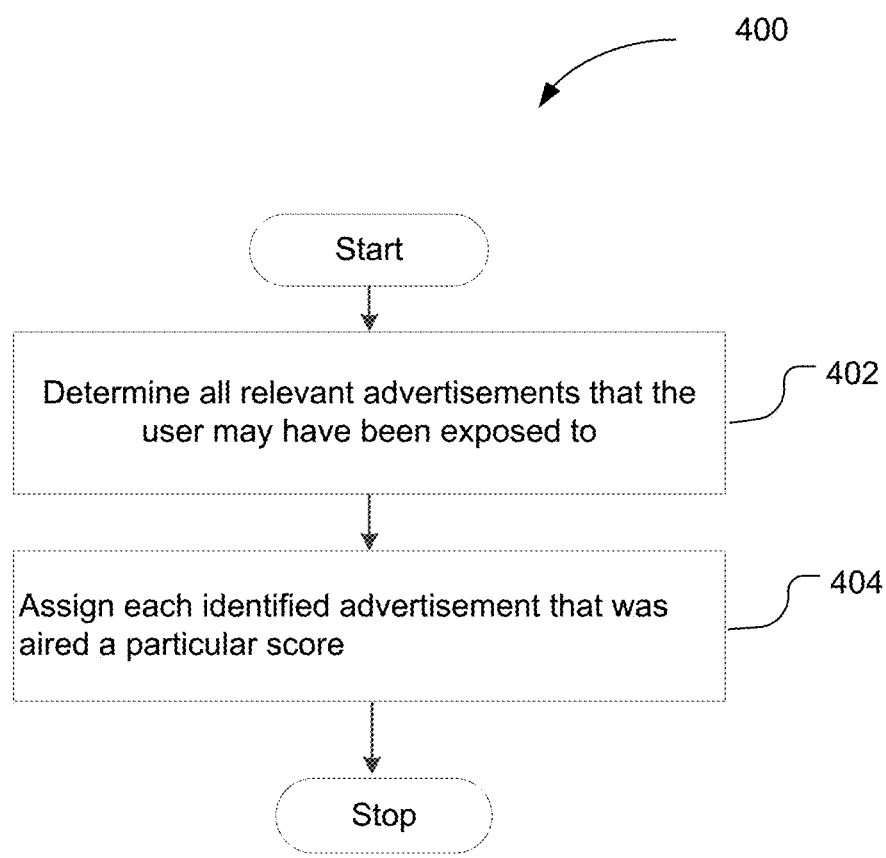
FIG. 4 illustrates an example process for measuring contribution of an advertisement to conversion in the environment of FIG. 1, in accordance with some embodiments.

FIG. 4 illustrates an example process for measuring contribution of an advertisement to conversion in the environment of FIG. 1, in accordance with some embodiments. The process 400 illustrates a detailed description of actions described in reference to block 220 of FIG. 2.

The process 400 may begin at block 402 and include determine all relevant advertisements that the user may have been exposed to. Such determination may be performed, for example, using the TV viewing data associated with the user (see block 218 of FIG. 2).

At block 404, the process 400 may include assigning each identified advertisement that was aired a particular score, e.g., a fraction of the credit for the conversion that followed, with all scores adding up to 100%. Different attribution models may apply credit differently. For example, all advertisements may be assigned equal credit, most recent advertisement may get most credit, the assigned scores may decay for older advertisement, and the like. For example, a user who performed a conversion event viewed four impressions of an advertiser's TV ads on various channels at different times. Using an equal weighting attribution model, the contribution each advertisement made to the conversion may be scored as follows: Impression A: 25%, Impression B: 25%, Impression C: 25%, Impression D: 25%.

In another example, a user who performed a conversion event viewed two impressions of an advertiser's TV advertisements: impression A on the day of the conversion, and impression B seven days previous. Using a time decay attribution model, the contribution each advertisement made to the conversion may be scored as follows: Impression A: 67%, Impression B: 33%.

Accordingly, at block 404, the process 400 may include applying an attribution model to the scored advertisements, to obtain a measurement of the contribution of the advertisements to the conversion event.

In summary, the processes described in reference to FIGS. 2-4 provide for obtaining a measurement of the contribution of the advertisements to conversion in the computing environment of FIG. 1. As described, such measurements may be provided in a form of credits assigned to different advertisements, and serve to assess the effectiveness of particular advertisements vis-à-vis subsequent conversion action undertaken by users. The computing environment of FIG. 1 may also serve to provide recommendations to advertisers regarding potential improvements in the advertisers' advertisement practices. For example, recommendations can be made based on certain advertisements or TV networks driving more conversions. Advertisement funding can be moved to more effective networks or shows and higher performing advertisements may be run instead of lower performing advertisements.

Figure 5:
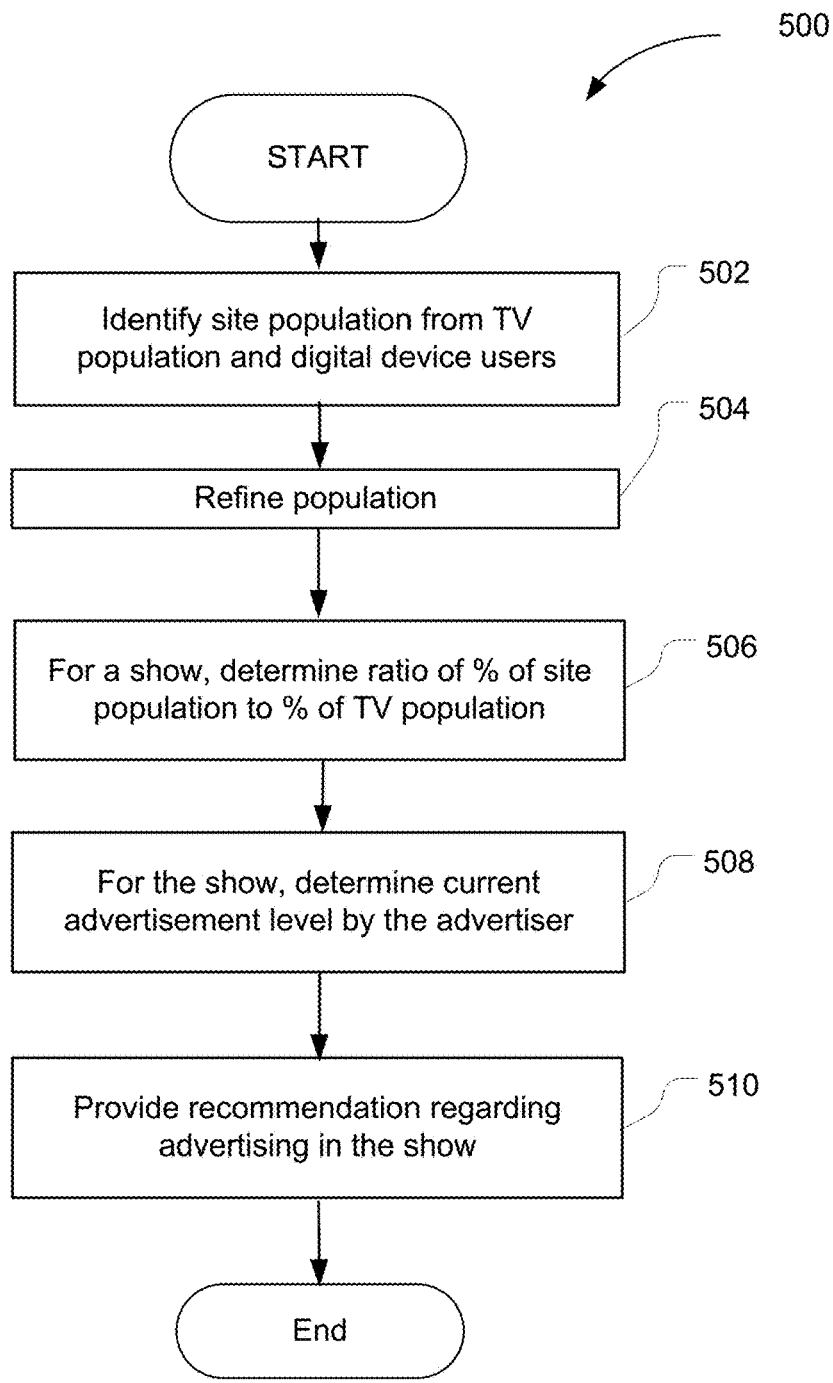
FIG. 5 illustrates an example process for providing recommendations to advertisers, in the environment of FIG. 1, in accordance with some embodiments.

FIG. 5 illustrates an example process for providing recommendations to advertisers, in the environment of FIG. 1, in accordance with some embodiments. The process 500 may be performed, for example, by the recommendation engine 138 of FIG. 1.

The process 500 may begin at block 502 and include identifying a web site population from TV users and digital device users. In other words, the users that have visited the merchant's web site, and that may be matched to their respective TV sets, may be identified.

At block 504, the process 500 may include refining the identified web site population. For example, TV sets may be identified that have user activity levels that make them outliers. For example, there may be TV sets that may be turned on 24 hours 7 days a week. In another example, TV sets may be identified as being secondary or otherwise very lightly used. The users of such TV sets may be excluded from the web site population.

At block 506, the process 500 may include determining a ratio of a percentage of the web site population to a percentage of TV population. Such determination may be made for particular show or program, in which the advertisement of the merchant (advertiser) was shown. In other words, at block 506 a comparison may be made as to how many users who visit the advertiser's site watch a particular show compared to the general population, and calculate an index. If 5% of the advertiser's users watch a show and 5% of the general population also watches it, the index may be 100, indicating advertiser's users watch the show at the same rate as the general population. If 10% of the advertiser's users watch a show vs 5% of the general population, the index may be 200, indicating that advertiser's users watch the show at twice the rate of the general population.

At block 508, the process 500 may include determining a current advertising level by the advertiser, for the show. The advertising level is a scale of the amount of advertisements the advertiser is currently purchasing on a given show. This scale may be categorized into, for example, None, Light, Medium, and Heavy. The exact numbers used to determine what falls into these categories depends on the type of a report being run and the date range being used.

At block 510, the process 500 may include providing a recommendation to the merchant (advertiser) regarding advertising in the particular show or program. For example, a recommendation matrix may be used that may take a currently advertising level and viewing index as inputs and provides a recommendation as output. The matrix may be, for example:
{−1, −1, 0, 0, 0},
{−1, −1, 0, 0, 1},
{−1, 0, 0, 1, 1},
{0, 0, 0, 1, 1}

Y-axis is advertising level (lowest at bottom), X-axis is viewing index (lowest at the left). The upper left is the extreme of lowest viewing index and highest current advertising level, and −1 is a recommendation of "Reduce buy". The lower right is the extreme of highest viewing index and lowest current advertising level, and 1 is a recommendation of "Increase buy". 0 means "Maintain buy". Reduce Buy may mean that too many advertisements are being run on a particular show given the audience. Accordingly, the amount of purchased advertisements may be reduced. Maintain Buy may mean maintaining running the current amount of advertisements on this show. Increase Buy may mean that the show's audience is more skewed toward a particular customer base and the advertising level is low. Accordingly, the amount of advertisements on this show may be increased.

Figure 6:
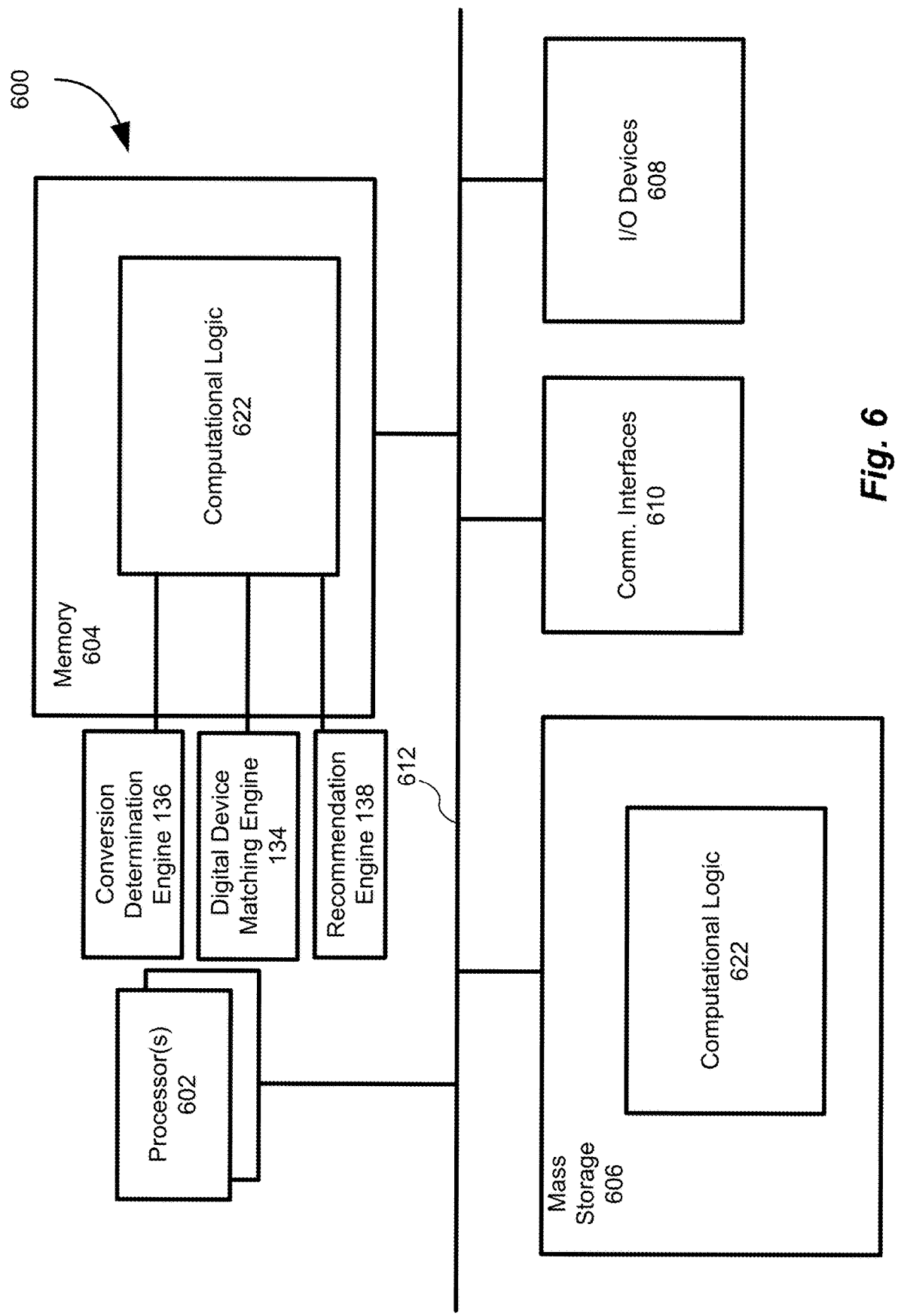
FIG. 6 illustrates an example computing device suitable for use to practice aspects of the present disclosure, in accordance with some embodiments.

FIG. 6 illustrates an example computing device suitable for use to practice aspects of the present disclosure, in accordance with some embodiments. For example, the example computing device 600 may be suitable to implement the functionalities of the computing device 124.

As shown, computing device 600 may include one or more processors or processor cores 602, and system memory 604. For the purpose of this application, including the claims, the term "processor" refers to a physical processor, and the terms "processor" and "processor cores" may be considered synonymous, unless the context clearly requires otherwise. The processor 402 may include any type of processors, such as a central processing unit (CPU), a microprocessor, and the like. The processor 602 may be implemented as an integrated circuit having multi-cores, e.g., a multi-core microprocessor. The computing device 600 may include mass storage devices 606 (such as diskette, hard drive, volatile memory (e.g., dynamic random access memory (DRAM)), compact disc read only memory (CD-ROM), digital versatile disk (DVD) and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 600 may further include input/output (I/O) devices 608 such as a display, keyboard, cursor control, remote control, gaming controller, image capture device, and so forth and communication interfaces (comm. INTF) 610 (such as network interface cards, modems, infrared receivers, radio receivers (e.g., Bluetooth), and so forth). I/O devices 608 may be suitable for communicative connections with user digital device 102 or TV set 104, as well as content provider computer 112.

The communication interfaces 610 may include communication chips (not shown) that may be configured to operate the device 600 (or 124) in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations associated with apparatus 124, e.g., operations associated with providing digital device matching engine 134, conversion determination engine 136, or recommendation engine 138 as described in reference to FIGS. 1-4, generally shown as computational logic 622. Computational logic 622 may be implemented by assembler instructions supported by processor(s) 602 or high-level languages that may be compiled into such instructions.

The permanent copy of the programming instructions may be placed into mass storage devices 606 in the factory, or in the field, through, for example, a distribution medium (not shown), such as a compact disc (CD), or through communication interfaces 610 (from a distribution server (not shown)).

Figure 7:
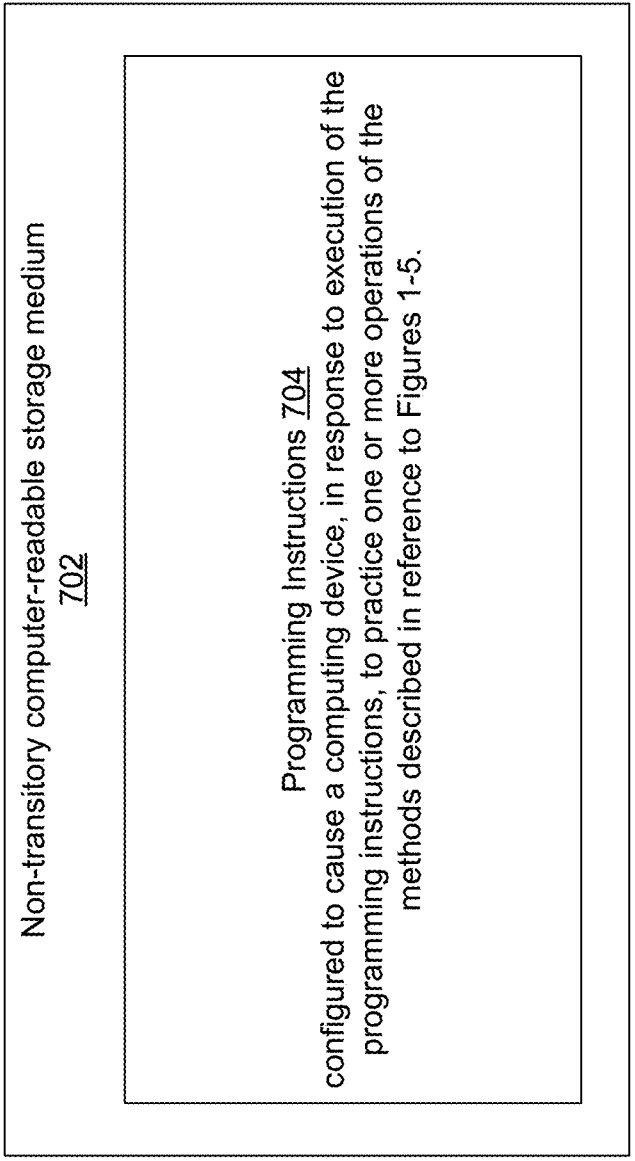
FIG. 7 illustrates an example non-transitory computer-readable storage medium having instructions configured to practice all or selected ones of the operations associated with the processes described in reference to FIGS. 1-5, in accordance with some embodiments.

FIG. 7 illustrates an example non-transitory computer-readable storage medium having instructions configured to practice all or selected ones of the operations associated with the processes described in reference to FIGS. 1-5, in accordance with some embodiments. As illustrated, non-transitory computer-readable storage medium 702 may include a number of programming instructions 704 (e.g., including engines 134, 136, and 138). Programming instructions 704 may be configured to enable a device, e.g., computing device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 704 may be encoded in transitory computer-readable signals.

Referring again to FIG. 6, the number, capability, and/or capacity of the elements 608, 610, 612 may vary, depending on whether computing device 400 is used to implement the computing device 124, whether computing device 600 is a stationary computing device, such as a set-top box or desktop computer, or a mobile computing device, such as a tablet computing device, laptop computer, or smartphone. Their constitutions are otherwise known, and accordingly will not be further described.

In various implementations, the computing device 600 when used to implement computing device 124 may comprise a stand-alone server or a server of a computing rack or cluster. In further implementations, the computing device 600 may be any other electronic device that processes data.

Computer-readable media (including non-transitory computer-readable media), methods, apparatuses, systems, and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus to determine effectiveness of an advertisement, comprising:
   one or more processors;
   a digital device matching engine, communicatively coupled to the one or more processors, to receive and process information obtained from a particular web site accessed by a digital device, and to match the digital device to a television (TV) set, based at least in part on the processed information; a conversion determination engine, communicatively coupled to the one or more processors, to determine a level of conversion associated with a particular advertisement rendered by a broadcasting media to the TV set, based at least in part on the matching of the digital device to the TV set, wherein the conversion defines one or more user actions performed on the web site in response to viewing the advertisement on the TV set, wherein the actions include viewing information provided on the web site about an item described in the advertisement, selecting the viewed item on the web site, adding the selected item to a cart on the web site, or checking out the selected items on the web site; and
   a recommendation engine, communicatively coupled to the one or more processors, to provide recommendations to a third party, associated with the web site, in regard to use of advertisements, based at least in part on the information obtained from the web site, wherein to provide the recommendations includes:
   determine a viewing index of a show in which the advertisement was broadcasted on the TV set, wherein the viewing index comprises a ratio of a number of users who visited the web site in response to seeing the advertisement in the show to a number of users who watched the show; and
   based at least in part on the viewing index, determine a change in a number of the advertisements to be included in the show, wherein the change includes maintaining a current number of advertisements in the show, reduction of the current number of advertisements in the show, or increase of the current number of advertisements in the show.

2. The apparatus of claim 1, wherein the processed information comprises one or more user identity indicators that include at least one of: date and time of access of the web site; an internet protocol (IP) address associated with the user; a web site identifier; a user identifier (ID) associated with the web site; a type of a conversion action associated with the user, including one or more of: a web site visit, add to cart, or checkout; a uniform resource locator (URL) associated with the web site; a type of a browser associated with access to the web site, a type of the digital device; operating system (OS) associated with the digital device; tracking cookies; or one or more tags for reporting or filtering, supplied by the third party.

3. The apparatus of claim 1, wherein the digital device matching engine is to determine web traffic associated with the digital device.

4. The apparatus of claim 3, wherein the digital device matching engine is to identify an internet protocol (IP) address of the digital device that was used by the digital device over a determined time period, based at least in part on the web traffic.

5. The apparatus of claim 4, wherein the digital device matching engine is to match the digital device to the TV set, further based at least in part on comparing a history of use of the IP address of the digital device and an IP address of the TV set.

6. The apparatus of claim 1, wherein the conversion determination engine is to identify one or more advertisements associated with an advertising entity, to determine the advertisement rendered by the broadcasting media to the TV set.

7. The apparatus of claim 6, wherein the conversion determination engine is to identify a viewing pattern associated with the TV set, based at least in part on viewing data provided by the TV set.

8. The apparatus of claim 7, wherein the viewing data includes content watched by a user of the TV set.

9. The apparatus of claim 7, wherein the conversion determination engine to determine the level of conversion associated with the advertisement includes to identify a level of contribution of the advertisement to the conversion, based at least in part on the viewing pattern and on an application of one or more attribution models to conversion events associated with the advertisement, wherein the conversion events include the user actions on the web site performed in response to viewing the advertisement.

10. The apparatus of claim 1, wherein the one or more user actions also include: accessing the web.

11. One or more non-transitory computer-readable media having instructions for determining effectiveness of an advertisement stored thereon that, in response to execution by a computing device, cause the computing device to:
   receive and process information obtained from a web site accessed by a digital device;
   match the digital device to a television (TV) set, based at least in part on the processed information;
   determine a level of conversion associated with an advertisement rendered by a broadcasting media to the TV set, based at least in part on the matching of the digital device to the TV set, wherein the conversion defines one or more user actions performed on the web site in response to viewing the advertisement on the TV set, wherein the actions include viewing information provided on the web site about an item described in the advertisement, selecting the viewed item on the web site, adding the selected item to a cart on the web site, or checking out the selected items on the web site; and provide recommendations to a third party, associated with the web site, in regard to use of advertisements, based at least in part on the information obtained from the web site, wherein to provide the recommendations includes:

determine a viewing index of a show in which the advertisement was broadcasted on the TV set, wherein the viewing index comprises a ratio of a number of users who visited the web site in response to seeing the advertisement in the show to a number of users who watched the show; and based at least in part on the viewing index, determine a change in a number of the advertisements to be included in the show, wherein the change includes maintaining a current number of advertisements in the show, reduction of the current number of advertisements in the show, or increase of the current number of advertisements in the show.

12. The non-transitory computer-readable media of claim 11, wherein the instructions further cause the computing device to identify an internet protocol (IP) address of the digital device that was used by the digital device over a determined time period, based at least in part on web traffic associated with the digital device.

13. The non-transitory computer-readable media of claim 12, wherein the instructions further cause the computing device to match the digital device to the TV set, based at least in part on comparing a history of use of the IP address of the digital device and an IP address of the TV set.

14. The non-transitory computer-readable media of claim 11, wherein the instructions further cause the computing device to identify a level of contribution of the advertisement to the conversion, based at least in part on an application of one or more attribution models to conversion events associated with the advertisement, wherein the conversion events include the user actions on the web site performed in response to viewing the advertisement.

15. A computer-implemented method, comprising:
receiving and processing, by a computing device, information obtained from a web site accessed by a digital device,
matching, by the computing device, the digital device to a television (TV) set, based at least in part on the processed information;

determining, by the computing device, a level of conversion associated with an advertisement rendered by a broadcasting media to the TV set, based at least in part on the matching of the digital device to the TV set, wherein the conversion defines one or more user actions performed on the web site in response to viewing the advertisement on the TV set, wherein the actions include viewing information provided on the web site about an item described in the advertisement, selecting the viewed item on the web site, adding the selected item to cart on the web site, or checking out the selected items on the web site; and providing, by the computing device, recommendations to a third party, associated with the web site, in regard to use of advertisements, based at least in part on the information obtained from the web site, wherein to provide the recommendations includes:

determining a viewing index of a show in which the advertisement was broadcasted on the TV set, wherein the viewing index comprises a ratio of a number of users who visited the web site in response to seeing the advertisement in the show to a number of users who watched the show; and based at least in part on the viewing index, determining a change in a number of the advertisements to be included in the show, wherein the change includes maintaining a current number of advertisements in the show, reduction of the current number of advertisements in the show, or increase of the current number of advertisements in the show.

16. The computer-implemented method of claim 15, wherein matching the digital device to the TV set includes:
identifying, by the computing device, an internet protocol (IP) address of the digital device that was used by the digital device over a determined time period, based at least in part on web traffic associated with the digital device; and
comparing, by the computing device, a history of use of the IP address of the digital device and an IP address of the TV set.

17. The computer-implemented method of claim 15, further comprising:
identifying, by the computing device, a level of contribution of the advertisement to the conversion, including applying, by the computing device, one or more attribution models to conversion events associated with the advertisement, wherein the conversion events include the user actions on the web site performed in response to viewing the advertisement.

* * * * *